Oct. 18, 1949.  W. R. HARRIS  2,484,825
MOTOR CONTROL SYSTEM FOR CORE TYPE REEL DRIVES
Filed Sept. 9, 1947
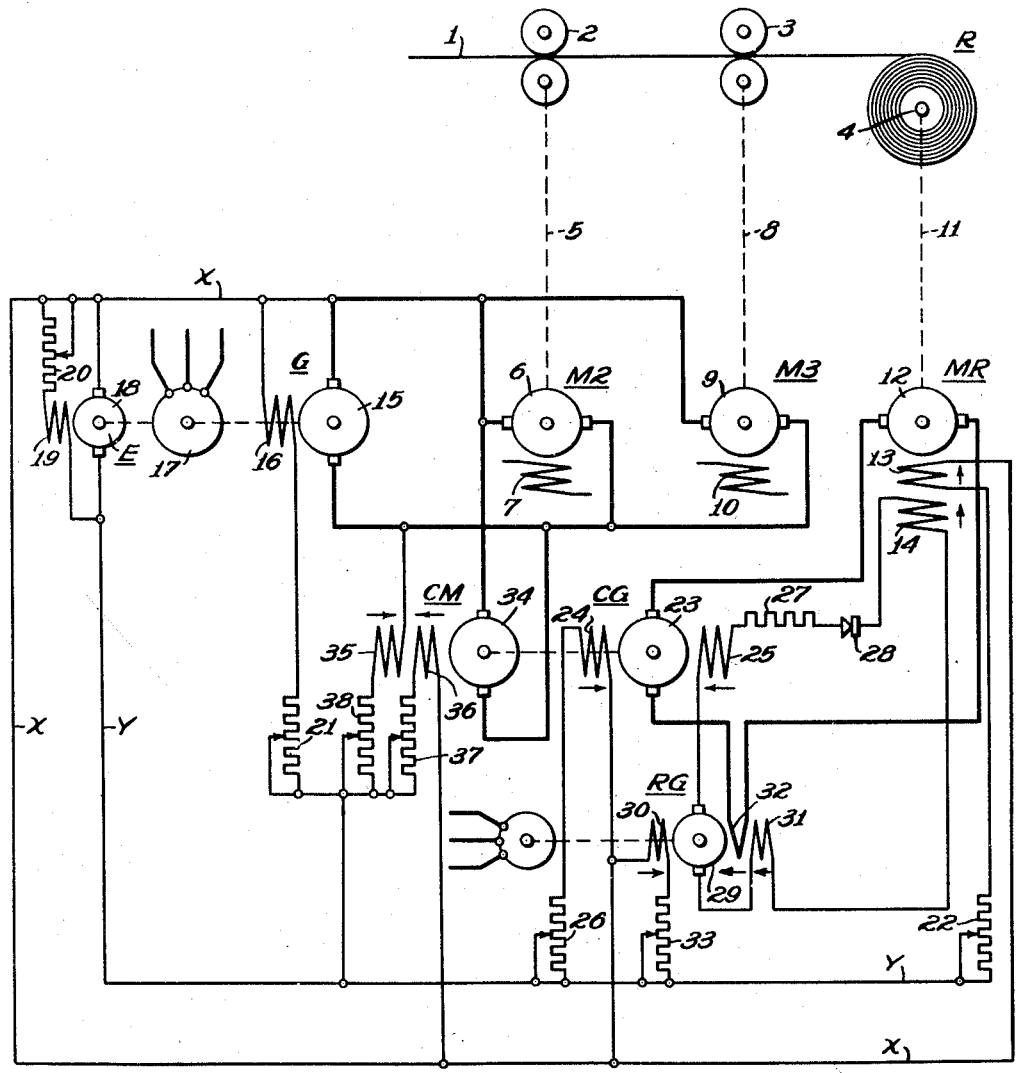
WITNESSES:
Robert C. Baird
INVENTOR
Walter R. Harris.
BY C. M.
ATTORNEY Patented Oct. 18, 1949

2,484,825

UNITED STATES PATENT OFFICE 2,484,825

MOTOR CONTROL SYSTEM FOR CORE TYPE REEL DRIVES

Walter R. Harris, Pittsburgh, Pa., assignor to Westinghouse Electric Corporation, East Pittsburgh, Pa., a corporation of Pennsylvania Application September 9, 1947, Serial No. 772,976

9 Claims. (Cl. 318—7)

My invention relates to electric drives and control systems for winding material, such as wires, strands, threads, sheets or webs of metal, paper, textile, plastic, or the like substances, onto or from a driven core.

It is an object of my invention to provide core type reel drives whose reel drive motor is controlled not only to maintain a desired winding tension in the wound material while reel diameter and reeling speed vary progressively during the winding operation, but also to adjust itself automatically to variations in the speed at which the material is supplied from or to the processing equipment associated with the reel drive.

Another object of the invention is the provision of a core type reel drive capable of operating over a large range of winding speeds, for instance 1 to 20, while maintaining, within the entire range, a desired winding tension which is properly corrected for the considerable speed-responsive change in the I. R. drop of the motor armature circuit.

Another object of the invention is to devise a core type reel drive which permits a considerable change, at will, in the operating speed of the associated processing equipment and yet regulates the reel drive motor for maintaining desired winding tension without requiring an operator to reset or recalibrate the reel drive system for different processing speeds.

In order to achieve these objects, and in accordance with a feature of my invention, I energize the armature circuit of a direct-current reel drive motor from a variable voltage generator whose voltage substantially corresponds to the speed of the associated processing equipment, and I excite the field of the reel drive motor by variable voltage from a regulating generator whose controlling field is excited in dependence upon the armature current of the drive motor.

These and more specific objects and features of my invention will be apparent from the following description of an embodiment, taken in conjunction with the drawing.

The drawing shows the circuit diagram of a control system for a winder drive associated with processing equipment. The material 1, for instance paper, passes through the processing machinery, here represented schematically by roll presses 2 and 3, and is wound up on a reel R whose core is denoted by 4. The equipment 2 is driven through a suitable transmission, here represented by a broken line 5, from the armature 6 of a direct-current motor M2, whose field winding is shown at 7. The equipment 3 is driven through a suitable transmission, also represented as a broken line and denoted by 8, from the armature 9 of a direct-current motor M3, whose field winding is shown at 10. The core 4 of the reel R is driven through a transmission 11 from the armature 12 of a direct-current motor MR. This motor has two cumulatively acting field windings 13 and 14.

The drive motors M2 and M3 of the processing equipment are energized from the armature 15 of a main generator G under control by the appertaining field winding 16. Armature 15 is driven at constant speed by an auxiliary motor 17 which also drives the armature 18 of an exciter E. The exciter is shown to have a shunt field winding 19 whose excitation is adjusted by means of rheostat 20. Once properly adjusted, the setting of the rheostat 20 need not be changed during the operation of the system. The exciter mains are denoted by X and Y. It should be understood that the exciter is represented merely as a convenient source of constant direct-current voltage and may be replaced by other suitable sources of such voltage.

The above-mentioned field winding 16 of main generator G is excited from the constant voltage mains X and Y in series with a rheostat 21. The setting of this rheostat determines the voltage generated in armature 15 and hence the speed of the motors M2 and M3 for driving the processing equipment 2 and 3. The above-mentioned field winding 13 of the reel drive motor MR is also excited from mains X and Y. The circuit of winding 13 includes a rheostat 22 which, after proper adjustment, need not be manipulated during the normal operation of the system.

The armature circuit of the reel drive motor MR is energized from the armature 23 of a control generator CG with two differentially acting field windings 24 and 25. Field winding 24 is connected across mains X and Y in series with a rheostat 26. As a rule, the adjustment of rheostat 26 requires no change during normal operation. Field winding 25 is connected to the motor field winding 14 in series with a calibrating resistor 27 and with a valve or rectifier 28, for instance of the dry type, such as a copper oxide or selenium rectifier.

The circuit of field windings 14 and 25 receives excitation from the armature 29 of a regulating generator RG with three field windings 30, 31 and 32. Field winding 31 is connected in the circuit of armature 29 in order to provide self-excitation for the regulating generator RG. While this winding is shown to be series connected, a shunt connection or compound arrangement may be used instead. By properly dimensioning the resistor 27, the resistance in the circuit of the self-exciting field winding 31 is so rated or "tuned" that its resistance line coincides approximately with the no-load saturation characteristic of the regulating generator. As a result, the self-excitation by field winding 31 provides almost all of the excitation required to maintain the generated voltage at any given point along the unsaturated, substantially linear portion of the magnetic characteristic of the machine. Consequently, the two other field windings 30 and 32 are called upon only to jointly provide the slight additional (additive or subtractive) excitation needed to shift the voltage point in accordance with the desired control and regulating performance. In this manner, the generator RG operates as a highly effective amplifier. If desired, the amplifying generator just described may be replaced by other types of known amplifying devices, preferably of the rotary generator type.

The control field windings 30 and 32 operate in opposition to each other. Consequently, the control signal that determines the magnitude of the control voltage impressed by the armature 29 on the circuit of field windings 14 and 25 is determined by the differential effect of the two control windings. The "pattern" field winding 30 is connected across mains X and Y in series with a rheostat 33. The adjustment of this rheostat determines the degree of pattern field excitation impressed on the generator RG. This excitation in turn determines the magnitude of the current flowing in the circuit of armatures 12 and 23 and hence the magnitude of the tension to be maintained in the material 1. The rheostat 33 can be set to any desired value and may be equipped with an indicating scale graduated in terms of winding tension. A change in adjustment of rheostat 33 is permitted during the operation of the system and has the effect of changing the winding tension accordingly without otherwise interfering with the reeling performance.

The "pilot" field winding 32 is connected with the circuit of armatures 12 and 23 and hence is excited in proportion to the armature current of the reel drive motor MR. When the armature current of reel motor MR has the proper value, the excitation of pilot field winding 32 is balanced by that of the pattern field winding 30 so that the differential control field is zero. When the armature current departs from the correct value as determined by the setting of rheostat 33, the differential excitation of control field windings 30 and 32 assumes a finite value whose magnitude and polarity depend upon the degree and direction of the departure. As a result, the output voltage of armature 29 in generator RG is changed in the direction required to reestablish the correct armature current.

The control generator CG has its armature 23 driven from the armature 34 of an auxiliary motor CM with two field windings 35 and 36. Windings 35 and 36 operate differentially. Winding 36 is connected across mains X and Y in series with a rheostat 37 of normally fixed adjustment. Field winding 35 is series connected with generator armature G across mains X and Y. The series connection includes a rheostat 38 also of normally constant adjustment.

It will be recognized that the reel control motor CM receives power through its armature circuit from the adjustable voltage generator G which forms part of the process line drive. Since field winding 36 of motor CM is normally excited at constant strength, the control motor CM will turn at a speed approximately proportional to the voltage of generator G and hence approximately proportional to the operating speed of the processing equipment. If the system is operated over a wide range of generator voltage, corresponding to a wide range in traveling speed of material 1, the resistance drop in the circuits of the armatures 12 and 23 will be an appreciable part of the total voltage at the lowest speed. In order to compensate for this change in I. R. drop, the armature 23 of control generator CG should operate at more than proportional speed when the traveling speed of material 1 is adjusted to lower values. Field winding 35 serves to accomplish such a compensation. The excitation of field winding 35 is proportional to the difference between the voltage generated by the main generator G and the constant voltage across mains X and Y. At top speed the voltage of generator G and the voltage across mains X and Y are approximately equal so that no appreciable current flows through field winding 35. Then the field winding 36 is substantially alone effective to control the speed of motor CM and hence the output voltage of control generator CG. When the speed of the processing drive is reduced by setting the rheostat 21 for a lower voltage of generator G, more current flows through field winding 35, thus weakening the net field strength of motor CM. Motor CM then runs at a more than proportional speed. The control generator CG is thus caused to develop higher than proportional voltages at the lower speeds to compensate for the greater percentage in resistance drop at these speeds.

The control generator CG, as regards its output voltage, is also under control by the differential effect of its field windings 24 and 25. Since the excitation of field winding 24 is constant, this control effect depends upon the change in excitation of field winding 25. The latter excitation is controlled by the regulating generator RG so that, as the roll of material wound on the core type reel increases in diameter, a lower voltage is supplied by generator CG to motor MR and the reeling speed is correspondingly lowered.

It will be noted that the total range in speed required of the reel motor MR to compensate for changes in roll diameter is obtained by a combination of voltage adjustment of control generator CG and shunt field adjustment of motor MR. For instance, the drive may require a 15 to 1 change in roll diameter, and in this case a 5 to 1 change in shunt field strength of the motor MR in combination with a 3 to 1 change in voltage of control generator CG may be utilized.

The excitation of motor field winding 13 determines the maximum speed of this motor which corresponds to an empty-core diameter. The field winding 14 is excited from the regulating generator RG at varying strength depending upon the roll diameter. The rectifier or valve 28 prevents a reversal of the excitation for field winding 14 so that the drive motor MR cannot run away due to the loss of excitation in field winding 32 of generator RG that may be caused by rupture of the material.

In summary, the reel drive motor MR is controlled by the regulating generator RG to vary its speed as the roll diameter varies so as to maintain constant armature current in reel motor RM and constant tension. The same motor is controlled, mainly by the performance of the control generator CG and its tie-up with the drive of the processing equipment, to also maintain winding tension regardless of changes in the adjustment of the processing speed. By virtue of the joint operation of the just-mentioned control elements for the reel drive motor MR, the system also compensates for changes in resistance (I. R.) drop that are due to changes in operating speed and thus secures a high degree of accuracy, even under operating conditions which require an extremely wide speed range.

It will be obvious to those skilled in the art that control systems according to the invention can be changed and modified with respect to details of circuit elements and circuit connections. For instance, while I have shown a reel drive motor, control generator, and regulating generator, each equipped with a plurality of jointly operating field windings, it is obvious that in one or several of these machines the field windings can readily be replaced by a single winding, and that the required differential or cumulative response can then be obtained by using a differentially or cumulatively operating field excitation circuit. These examples, as well as the modifications mentioned previously, will suffice to show that the invention can be carried out by means different from those specifically illustrated and described in this disclosure, without departing from the essential features of my invention and within the scope of the claims attached hereto.

I claim as my invention:

1. A drive system for reeling material, comprising a speed-adjustable drive motor determining the linear speed of the material, an adjustable-voltage source connected to said motor for controlling said speed, a reel motor having an armature circuit and a field circuit, a control generator series connected in said armature circuit to impress variable voltage thereon, means for driving said control generator in dependence upon said speed, a regulating generator having an armature connected to said motor field circuit to provide variable excitation therefor and having control field means connected to said armature circuit so as to control said excitation in response to the current flowing in said armature circuit, whereby said motor is caused to maintain desired reeling effort regardless of changes in speed.

2. A drive system for reeling material, comprising a speed-adjustable drive motor determining the linear speed of the material, an adjustable-voltage source connected to said motor for controlling said speed, a reel motor having an armature circuit and a field circuit, a control generator having an armature series-connected in said motor armature circuit to impress variable voltage thereon and having first and second control means for jointly controlling said variable voltage, said first control means being connected to said source for controlling said variable voltage in dependence upon said speed, a regulating generator having an armature for providing variable exciting voltage and having control field means connected to said motor armature circuit so as to control said exciting voltage in dependence upon the current flowing in said armature circuit, said armature of said regulating generator being connected to said motor field circuit and to said second control means so as to control said motor for desired reeling effort regardless of changes in speed.

3. A drive system for reeling material, comprising a speed-adjustable drive motor determining the linear speed of the material, an adjustable-voltage source connected to said motor for controlling said speed, a reel motor having an armature circuit and a field circuit, a control generator having an armature electrically connected in said motor armature circuit to provide energizing voltage therefor, auxiliary drive means mechanically connected to said generator armature and electrically connected to said source for driving said armature at a speed substantially proportional to said linear speed in order to accordingly control said energizing voltage, a regulating generator connected to said motor field circuit to provide variable excitation therefor and having control field means connected to said armature circuit so as to control said excitation in response to the current flowing in said armature circuit, whereby said reel motor is caused to maintain desired reeling effort regardless of changes in speeds.

4. A drive system for reeling material, comprising speed-adjustable drive means determining the linear speed of the material, said drive means having a drive motor and a source of adjustable voltage for said motor, a reel motor having an armature circuit and a field circuit, a control generator having an armature series-connected in said armature circuit to provide variable voltage therefor, an auxiliary drive motor electrically connected to said source and mechanically connected to said armature for driving said armature at a speed substantially proportional to said linear speed, a field winding on said control generator, a regulating generator having an armature for providing variable exciting voltage and having control field means connected to said armature circuit so as to control said exciting voltage in dependence upon the current flowing in said armature circuit, said armature of said regulating generator being connected to said field circuit and to said field winding, whereby said reel motor is controlled for substantially constant reeling effort regardless of speed changes.

5. A drive system for the reeling of traveling material, comprising a drive motor determining the traveling speed of the material, an adjustable-voltage source connected to said drive motor, a reel motor having an armature circuit and a field circuit, a control generator having an armature electrically connected to said motor armature circuit to energize the latter, a variable-speed motor in driving connection with said generator armature and electrically connected to said adjustable-voltage source to operate said armature at a speed dependent upon that of said drive motor, a regulating generator connected to said motor field circuit to provide variable excitation therefor and having control field means connected to said armature circuit so as to control said excitation in response to the current flowing in said armature circuit, whereby said reel motor is caused to exert substantially constant reeling effort regardless of changes in speed.

6. A drive system for the reeling of traveling material, comprising an adjustable-voltage drive determining the traveling speed of the material and having a drive motor and an adjustable-voltage source connected to said drive motor, a reel motor having an armature circuit and a field circuit, a control generator having a field winding and having an armature connected in said motor armature circuit for energizing the latter, an auxiliary motor in driving connection with said generator armature and electrically connected to said adjustable-voltage source to operate said armature at a speed dependent upon that of said drive, a regulating generator having an armature for providing variable exciting voltage and having control field means connected to said motor armature circuit so as to control said exciting voltage in dependence upon the current flowing in said armature circuit, said armature of said regulating generator being connected to said motor field circuit and to said generator field winding to control said reel motor for constant reeling effort regardless of changes in speed.

7. A drive system for reeling material, comprising speed-adjustable drive means determining the linear speed of the material and having a drive motor and an adjustable-voltage source connected to said drive motor, a reel motor having an armature circuit and a field circuit, a control generator series connected in said motor armature circuit to impress variable voltage thereon and having an auxiliary drive motor connected to said source for controlling said variable voltage in dependence upon said speed, said control generator having field means connected to said source so as to increase said energizing voltage with a decrease in said speed for compensating I. R. drop changes in said armature circuit, a regulating generator having an armature connected to said motor field circuit to provide variable excitation therefor and having control field means connected to said armature circuit so as to control said excitation in response to the current flowing in said armature circuit, whereby said motor is caused to exert substantially constant reeling effort regardless of changes in speed.

8. A drive system for the reeling of traveling material, comprising a drive motor determining the traveling speed of the material, an adjustable-voltage circuit connected to said drive motor for controlling said speed, a reel motor having an armature circuit and a field circuit, a control generator having an armature electrically connected to said motor armature circuit to energize the latter, an auxiliary motor having an armature in driving connection with said generator armature and electrically connected to said adjustable-voltage circuit, said auxiliary motor having two mutually differential field means, constant-voltage supply means connected to one of said field means, said other field means being connected to said adjustable-voltage circuit and to said constant-voltage supply means so that the speed of said auxiliary motor decreases at a lower rate than the decrease in said traveling speed to compensate for increasing I. R. drop changes in said armature circuit, a regulating generator connected to said motor field circuit to provide variable excitation therefor and having control field means connected to said armature circuit so as to control said excitation in response to the current flowing in said armature circuit, whereby said motor is caused to exert substantially constant reeling effort regardless of changes in speed.

9. A drive system for the reeling of traveling material, comprising a drive motor determining the traveling speed of the material, an adjustable-voltage circuit connected to said drive motor for controlling said speed, a reel motor having an armature circuit and a field circuit, a control generator having two mutually differential field windings and an armature electrically connected to said motor armature circuit to energize the latter, an auxiliary motor having an armature in driving connection with said generator armature and electrically connected to said adjustable-voltage circuit, said auxiliary motor having two mutually differential field means, constant-voltage supply means connected to one of said generator field windings and to one of said auxiliary motor field means, said other field means being connected to said adjustable-voltage circuit and to said constant-voltage supply means so that the speed of said auxiliary motor decreases at a lower rate than the decrease in said traveling speed to compensate for increasing I. R. drop changes in said armature circuit, a regulating generator having an armature for providing variable exciting voltage and having control field means connected to said motor armature circuit so as to control said exciting voltage in dependence upon the current flowing in said armature circuit, said armature of said regulating generator being connected to said motor field circuit and to said other generator field winding, whereby said reel motor is controlled for substantially constant reeling effort regardless of changes in speed.

WALTER R. HARRIS.

REFERENCES CITED

The following references are of record in the file of this patent:

UNITED STATES PATENTS

| Number | Name | Date |
|---|---|---|
| 2,320,850 | Cook | June 1, 1943 |
| 2,414,524 | Harris et al. | Jan. 21, 1947 |
| 2,432,876 | Formhals et al. | Dec. 16, 1947 |